(12) United States Patent
Chen et al.

(10) Patent No.: US 12,035,364 B2
(45) Date of Patent: Jul. 9, 2024

(54) SECONDARY CELL ACTIVATION MECHANISM IN THE NEW RADIO UNLICENSED SPECTRUM

(71) Applicant: Apple Inc., Cupertino, CA (US)

(72) Inventors: Xiang Chen, Campbell, CA (US); Dawei Zhang, Saratoga, CA (US); Huaning Niu, San Jose, CA (US); Jie Cui, San Jose, CA (US); Manasa Raghavan, Sunnyvale, CA (US); Qiming Li, Beijing (CN); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 386 days.

(21) Appl. No.: 17/437,784

(22) PCT Filed: Mar. 31, 2021

(86) PCT No.: PCT/CN2021/084343
§ 371 (c)(1),
(2) Date: Dec. 8, 2021

(87) PCT Pub. No.: WO2022/205048
PCT Pub. Date: Oct. 6, 2022

(65) Prior Publication Data
US 2022/0417990 A1  Dec. 29, 2022

(51) Int. Cl.
*H04W 74/0808* (2024.01)

(52) U.S. Cl.
CPC ............... *H04W 74/0808* (2013.01)

(58) Field of Classification Search
CPC ................................. H04W 74/0808
See application file for complete search history.

(56) References Cited

U.S. PATENT DOCUMENTS

| 11,394,439 B2 * | 7/2022 | Lomayev | H04B 7/15535 |
| 11,490,428 B2 * | 11/2022 | Tsai | H04W 74/085 |
| 2019/0037509 A1 * | 1/2019 | Li | H04W 56/001 |
| 2020/0029238 A1 * | 1/2020 | Si | H04W 24/10 |

(Continued)

OTHER PUBLICATIONS

International Search Report for PCT/CN2021/084343; 9 pages; dated Mar. 31, 2021.

(Continued)

*Primary Examiner* — Jael M Ulysse
(74) *Attorney, Agent, or Firm* — Kowert, Hood, Munyon, Rankin & Goetzel, P.C.

(57) ABSTRACT

An apparatus may receive a media access control (MAC) control element (CE) from a base station (BS) indicating a secondary cell (SCell) to be activated in an unlicensed band. The apparatus may initiate a timer with an end value in response to receiving the MAC CE and may further adjust a radio-frequency (RF) chain from a first state to a second state corresponding to the SCell to be activated. The apparatus may determine, based on measurements of one or more synchronization signal blocks (SSBs) transmitted from the BS indicating one or more listen before talk (LBT) failures corresponding to the SCell, one or more failed SSB transmissions corresponding to the SCell. Accordingly, the apparatus may readjust, in response to expiry of the timer, the RF chain from the second state to the first state and receive one or more additional SSBs in the first state.

20 Claims, 12 Drawing Sheets

(56) References Cited

U.S. PATENT DOCUMENTS

| | | | |
|---|---|---|---|
| 2020/0053781 A1* | 2/2020 | Pan | H04W 72/30 |
| 2020/0236711 A1* | 7/2020 | Nam | H04W 74/0808 |
| 2020/0260300 A1* | 8/2020 | Cirik | H04W 72/046 |
| 2020/0260428 A1* | 8/2020 | Xu | H04W 76/27 |
| 2020/0275485 A1* | 8/2020 | Babaei | H04W 74/0808 |
| 2021/0235513 A1* | 7/2021 | Kim | H04W 74/0816 |
| 2021/0289456 A1* | 9/2021 | Brueck | H04W 74/0816 |
| 2021/0297212 A1* | 9/2021 | Zhang | H04L 5/0048 |
| 2022/0039016 A1* | 2/2022 | Terry | H04W 52/0235 |
| 2022/0070928 A1* | 3/2022 | Babaei | H04W 74/004 |
| 2022/0174512 A1* | 6/2022 | Rune | H04W 24/10 |
| 2022/0346174 A1* | 10/2022 | Wang | H04W 74/0808 |
| 2023/0026600 A1* | 1/2023 | Xie | H04W 52/028 |

OTHER PUBLICATIONS

Mediatek Inc. "Discussion on SCell activation requirement sin NR-U"; 3GPP TSG-RAN WG4 Meeting #96-e R4-2010211; 5 pages; Aug. 28, 2020.

Huawei et al. "Discussion on SCell activation and deactivation requirements for NR-U"; 3GPP TSG-RAN WG4 Meeting #97-e R4-2015517; 4 pages; Nov. 13, 2020.

* cited by examiner

SECONDARY CELL ACTIVATION MECHANISM IN THE NEW RADIO UNLICENSED SPECTRUM

FIELD

The invention relates to wireless communications, and more particularly to apparatuses, systems, and methods for improved secondary cell (SCell) activation mechanisms in an unlicensed spectrum.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, cHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies.

Further, wireless communication technology has evolved from voice-only communications to also include the transmission of data, such as Internet and multimedia content. Additionally, interference, collisions and conflicts between transmissions of one or multiple radio access technologies (RATs) are increasingly possible (e.g., in unlicensed spectrum). For example, collisions may be possible between transmissions, e.g., between 5G/cellular transmissions and/or wireless local area network (WLAN) transmissions. Interference, collisions, and conflicts may degrade the wireless ecosystem and lead to negative impacts on users, e.g., of one or more RATs. Accordingly, improvements in the field in support of such development and design are desired.

SUMMARY

Embodiments relate to wireless communications, and more particularly to apparatuses, systems, and methods for improved secondary cell (SCell) activation mechanisms for an unlicensed spectrum.

In some embodiments, an apparatus may include a memory and at least one processor in communication with the memory and configured to receive a media access control (MAC) control element (CE) from a base station (BS) indicating a secondary cell (SCell) to be activated in an unlicensed band. In response to receiving the MAC CE, the apparatus may be further configured to initiate a timer with an end. Additionally, the apparatus may adjust a radio-frequency (RF) chain to from a first state to a second state corresponding to the SCell to be activated. The apparatus may determine, based on measurements of one or more synchronization signal blocks (SSBs) transmitted from the BS indicating one or more listen before talk (LBT) failures corresponding to the SCell, one or more failed SSB transmissions corresponding to the SCell. Accordingly, the apparatus may readjust, in response to expiry of the timer, the RF chain from the second state to the first state and receive one or more additional SSBs in the first state.

In some embodiments, the end value may be pre-defined, specified by the network, or determined by the apparatus. Moreover, the end value determined by the apparatus may be based on at least one of the apparatus' RF retuning time, power consumption of the RE chain, number of activated component carriers (CCs) and their associated bandwidths, and/or automatic gain control (AGC) performance in the unlicensed band. Additionally, the at least one processor may be configured to generate instructions to inform the base station of the determined end value and the end value may be below a pre-defined upper bound, according to some embodiments.

The techniques described herein may be implemented in and/or used with a number of different types of devices, including but not limited to unmanned aerial vehicles (UAVs), unmanned aerial controllers (UACs), base stations, access points, cellular phones, tablet computers, wearable computing devices, portable media players, automobiles and/or motorized vehicles, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
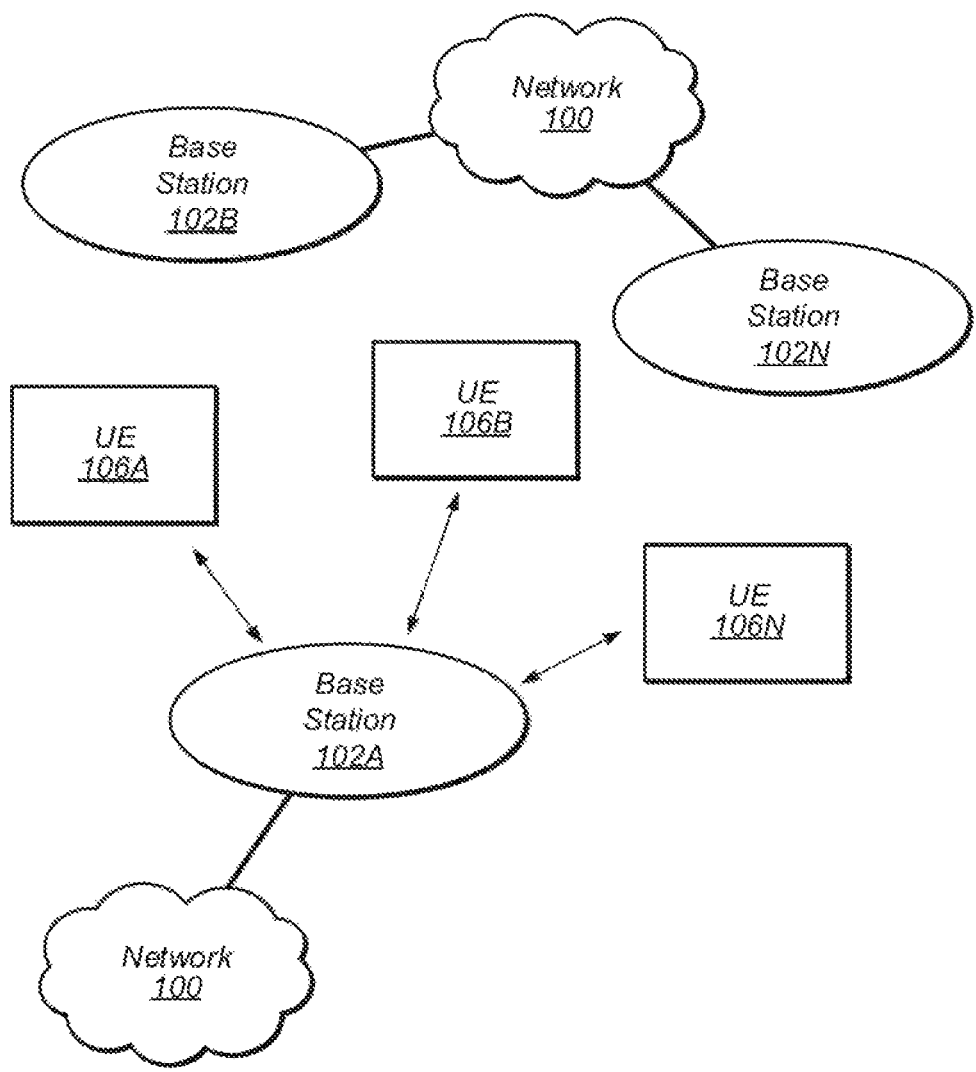
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
TS: Technical Specification
RAN: Radio Access Network
RAT: Radio Access Technology
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC: 5G Core Network
IE: Information Element
ITS: Intelligent Transportation System
LBT: Listen Before Talk
SSB: Synchronization Signal Block
RRM: Radio Resource Management
RLM: Radio Link Management
BM: Broadcast Multicast
COT: Channel Occupancy Time
QCL: Quasi-Colocated
SMTC: SSB-Based RRM Measurement Timing Configuration
PCC: Primary Component Carrier
SCC: Secondary Component Carrier
BC: Band Combination
CC: Component Carrier
SCell: Secondary Cell
CA: Carrier Aggregation
LO: Local Oscillator
AGC: Automatic Gain Control
RSSI: Received Signal Strength Indicator Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPGAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device") any of various types of computer systems to devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, automobiles and/or motor vehicles, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by (or with) a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes to a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
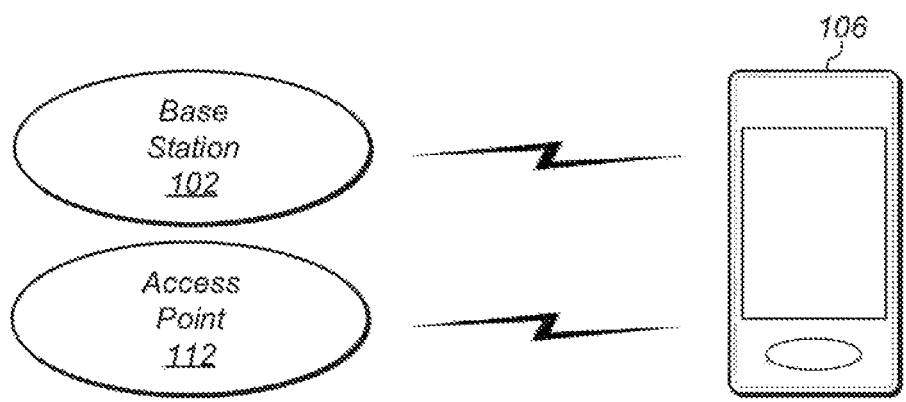
FIG. 1B illustrates an example of a base station (BS) and an access point in communication with a user equipment (UE) device according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a to wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
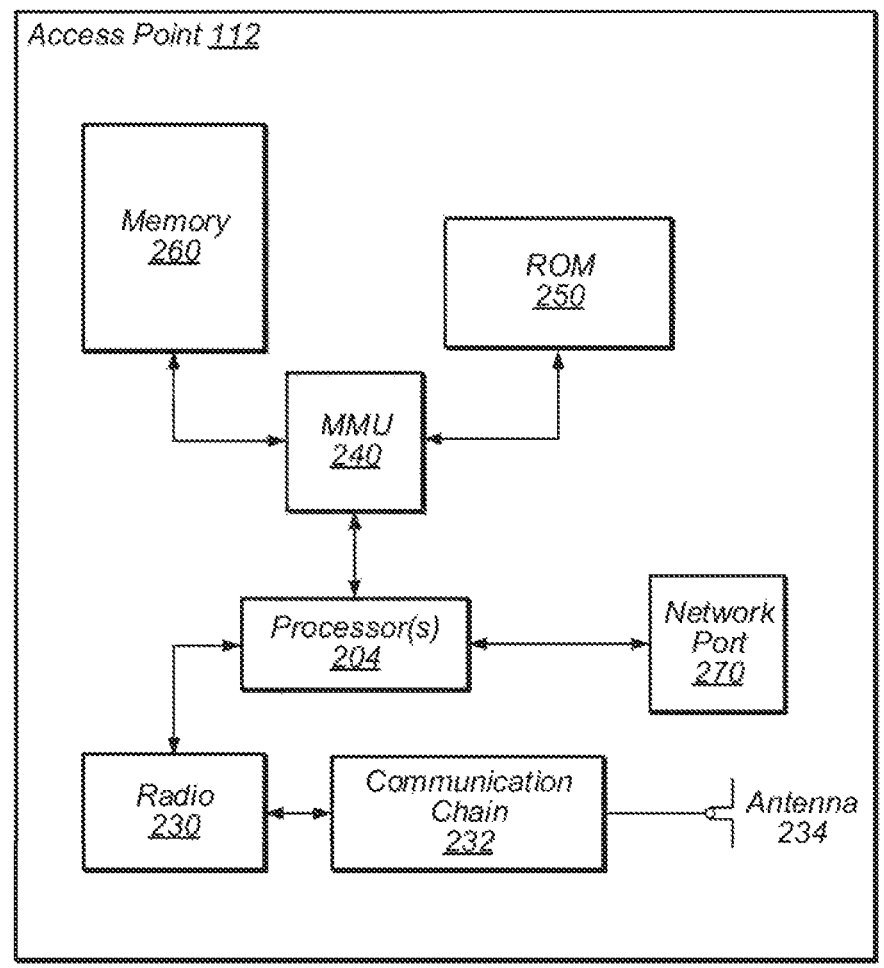
FIG. 2 illustrates an example simplified block diagram of a WLAN Access Point (AP), according to some embodiments.

FIG. 2: Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for overhead reduction for multi-carrier beam selection and power control as further described herein.

Figure 3A:
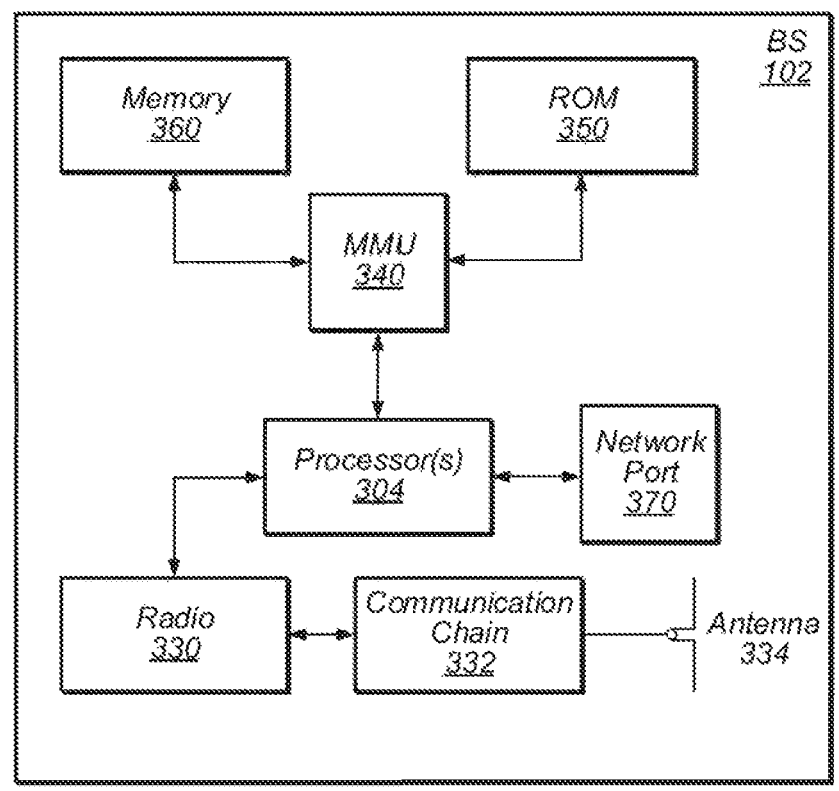
FIG. 3A illustrates an example block diagram of a BS according to some embodiments.

FIG. 3A: Block Diagram of a Base Station

FIG. 3A illustrates an example block diagram of a base station 102, according to some embodiments. It is noted that the base station of FIG. 3A is merely one example of a possible base station. As shown, the base station 102 may include processor(s) 304 which may execute program instructions for the base station 102. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above in FIGS. 1 and 2.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 334, and possibly multiple antennas. The at least one antenna 334 may be configured to operate as a wireless transceiver and may be further configured to communicate with UE devices 106 via radio 330. The antenna 334 communicates with the radio 330 via communication chain 332. Communication chain 332 may be a receive chain, a transmit chain or both. The radio 330 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 304 of the base station 102 may be configured to implement or support implementation of part or all of the methods described herein, e.g., by executing program instructions stored on a memory medium (e.g., a non-transitory computer-readable memory medium). Alternatively, the processor 304 may be configured as a programmable hardware element, such as an FPGA (Field Programmable Gate Array), or as an ASIC (Application Specific Integrated Circuit), or a combination thereof. Alternatively (or in addition) the processor 304 of the BS 102, in conjunction with one or more of the other components 330, 332, 334, 340, 350, 360, 370 may be configured to implement or support implementation of part or all of the features described herein.

In addition, as described herein, processor(s) 304 may be comprised of one or more processing elements. In other words, one or more processing elements may be included in processor(s) 304. Thus, processor(s) 304 may include one or more integrated circuits (ICs) that are configured to perform the functions of processor(s) 304. In addition, each integrated circuit may include circuitry (e.g., first circuitry, second circuitry, etc.) configured to perform the functions of processor(s) 304.

Further, as described herein, radio 330 may be comprised of one or more processing elements. In other words, one or more processing elements may be included in radio 330. Thus, radio 330 may include one or more integrated circuits (ICs) that are configured to perform the functions of radio 330. In addition, each integrated circuit may include circuitry (e.g., first circuitry, second circuitry, etc.) configured to perform the functions of radio 330.

Figure 3B:
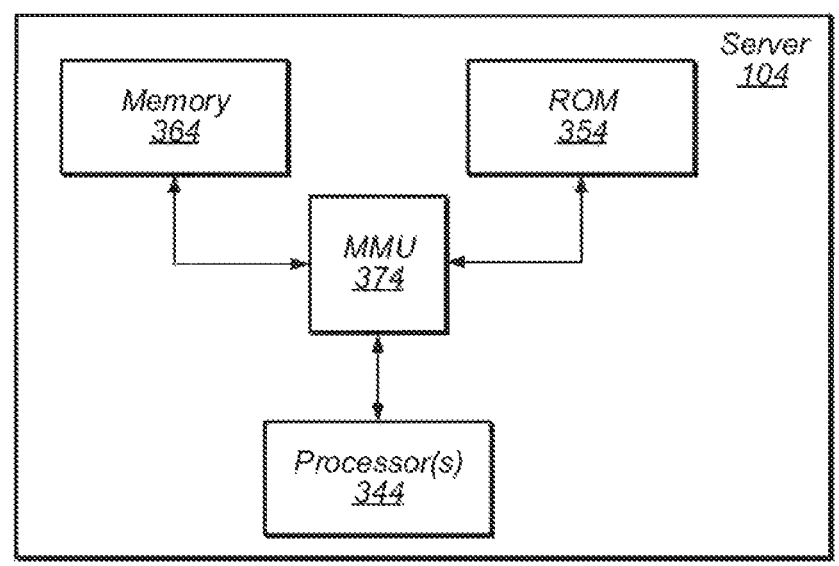
FIG. 3B illustrates an example block diagram of a server according to some embodiments.

FIG. 3B: Block Diagram of a Server

FIG. 3B illustrates an example block diagram of a server 104, according to some embodiments. It is noted that the server of FIG. 3B is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
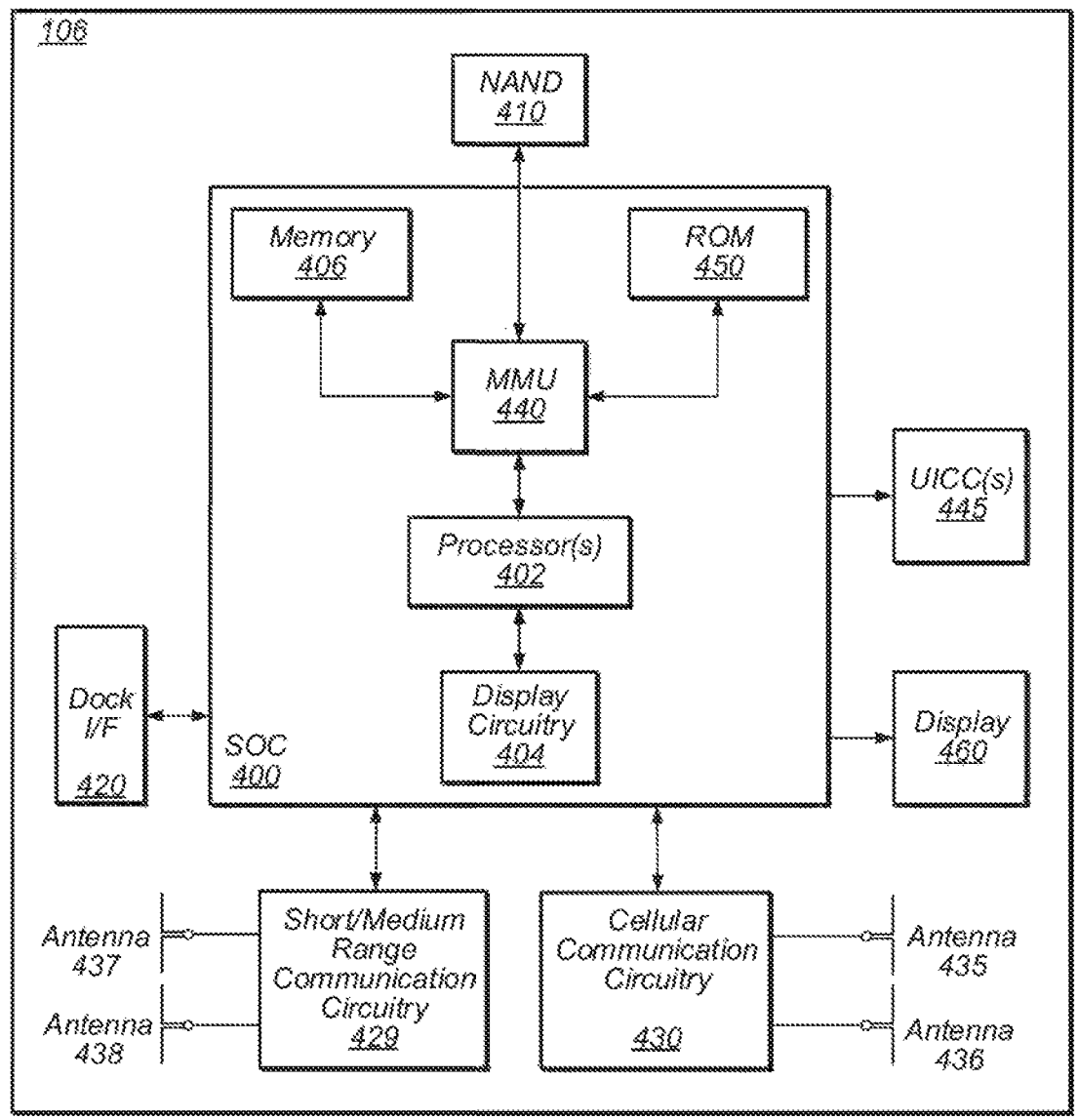
FIG. 4 illustrates an example block diagram of a UE according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106, and cellular communication circuitry 430 such as for 5G NR, LTE, GSM, etc., and short to medium range wireless communication circuitry 429 (e.g., Bluetooth™ and WLAN circuitry). In some embodiments, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some embodiments, as further described below, cellular communication circuitry 430 may include dedicated receive chains (including and/or coupled to, e.g., communicatively; directly or indirectly dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM may be implemented as a removable smart card. Thus, the SIM(s) may be one or more removable smart cards (such as UICC cards, which are sometimes referred to as "SIM cards"), and/or the SIMs 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two to removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM support a second RAT such as 5G NR. Other implementations and RATs are of course possible. In some embodiments, when the UE 106 comprises two SIMs, the UE 106 may support Dual SIM Dual Active (USDA) functionality. The USDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for beam failure recovery based on a unified TCI framework, e.g., in 5G NR systems and beyond, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
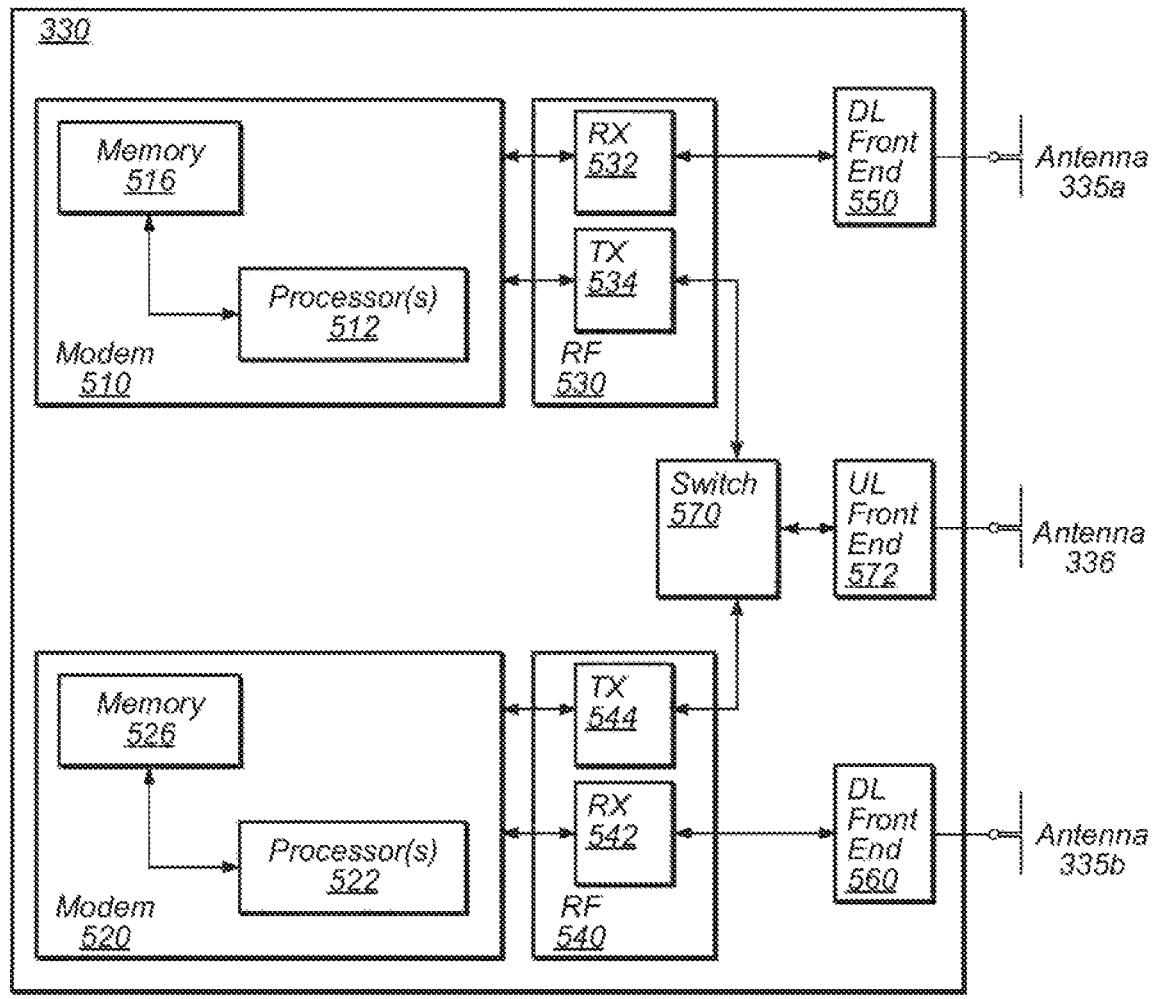
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively; directly or indirectly) to one or more antennas, such as antennas 435*a-b* and 436 as shown (in FIG. 4). In some embodiments, cellular communication circuitry 530 may include dedicated receive chains (including and/or coupled to, e.g., communicatively; directly or indirectly dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods beam failure recovery based on a unified TCI framework, e.g., in 5G NR systems and beyond, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
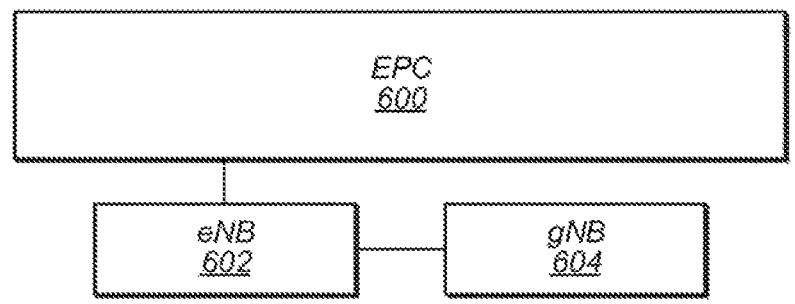
FIG. 6A illustrates an example of connections between an EPC network, an LTE base station (eNB), and a 5G NR base station (gNB).
Figure 6B:
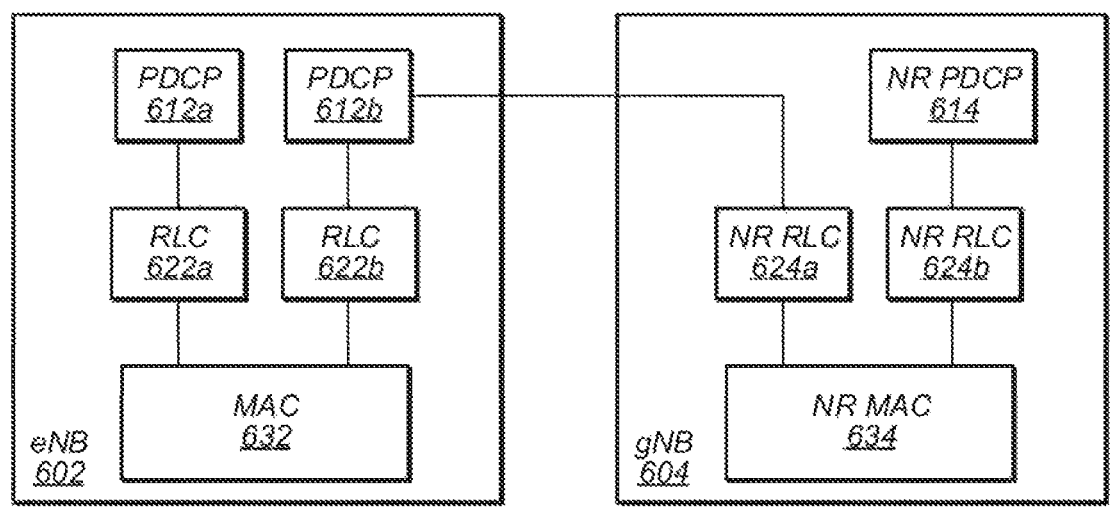
FIG. 6B illustrates an example of a protocol stack for an eNB and a gNB.

FIGS. 6A and 6B: 5G NR Architecture with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for cNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of cNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be to required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Figure 7A:
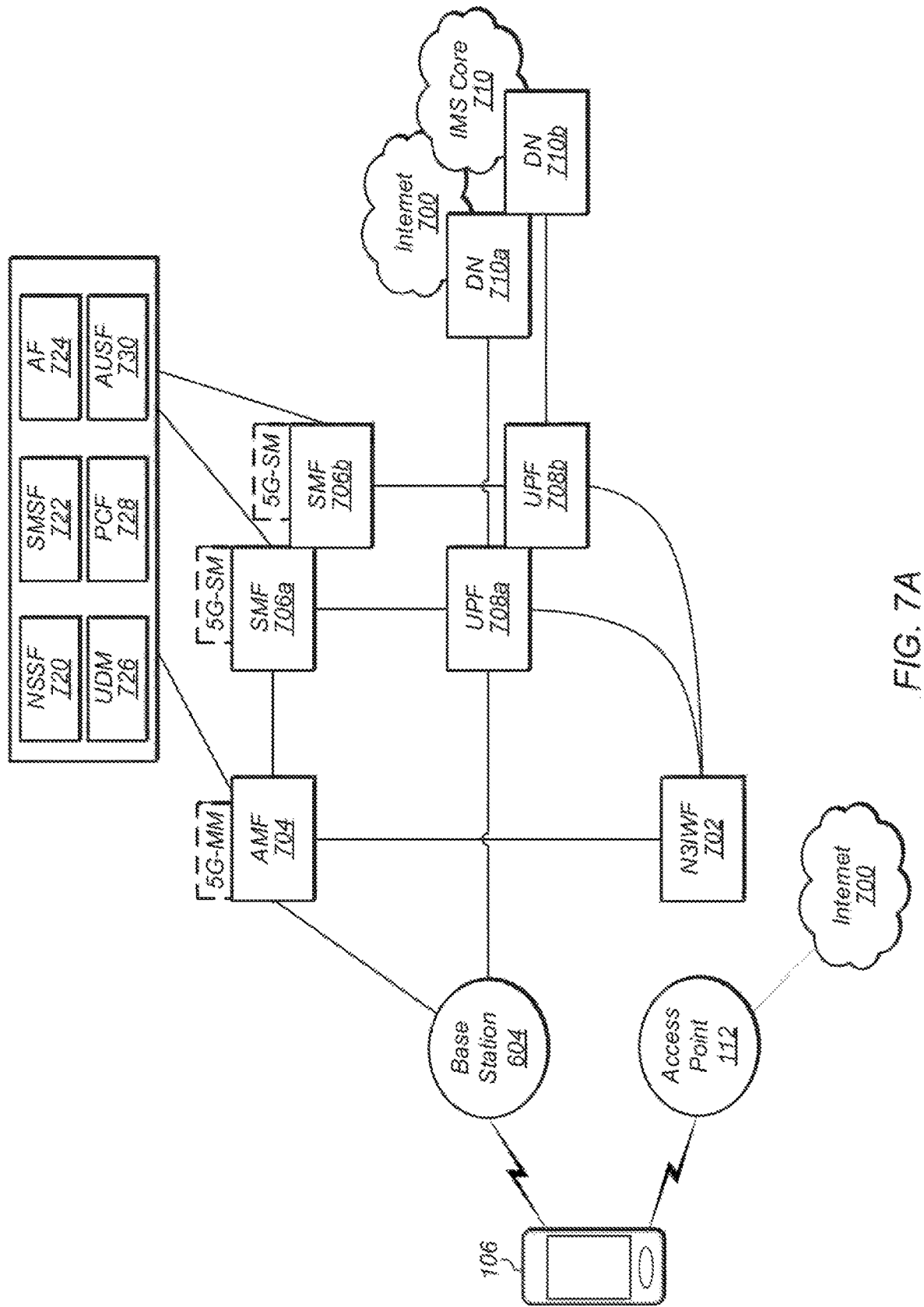
FIG. 7A illustrates an example of a 5G network architecture that incorporates both 3GPP (e.g., cellular) and non-3GPP (e.g., non-cellular) access to the 5G CN, according to some embodiments.
Figure 7B:
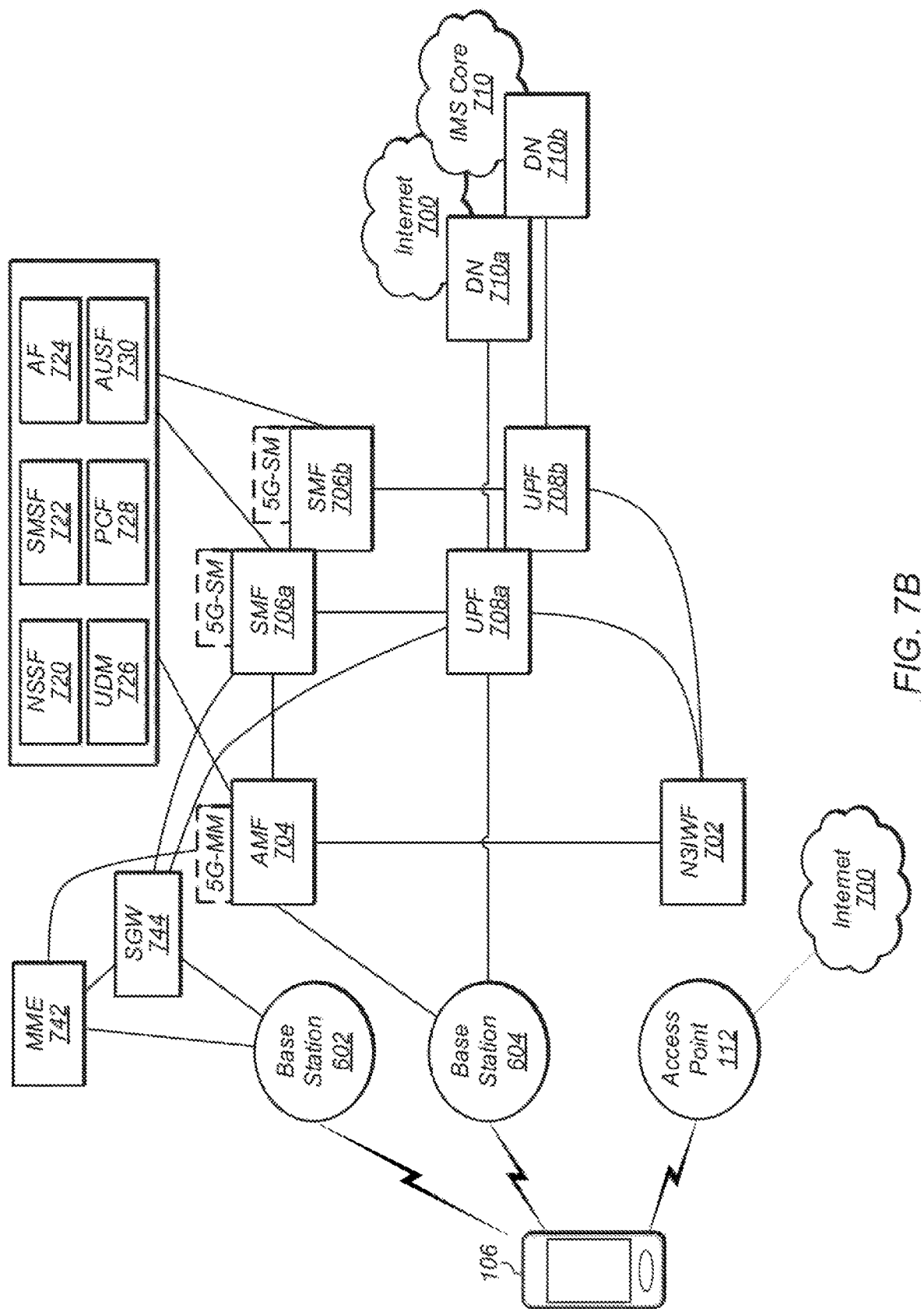
FIG. 7B illustrates an example of a 5G network architecture that incorporates both dual 3GPP (e.g., LTE and 5G NR) access and non-3GPP access to the 5G CN, according to some embodiments.
Figure 8:
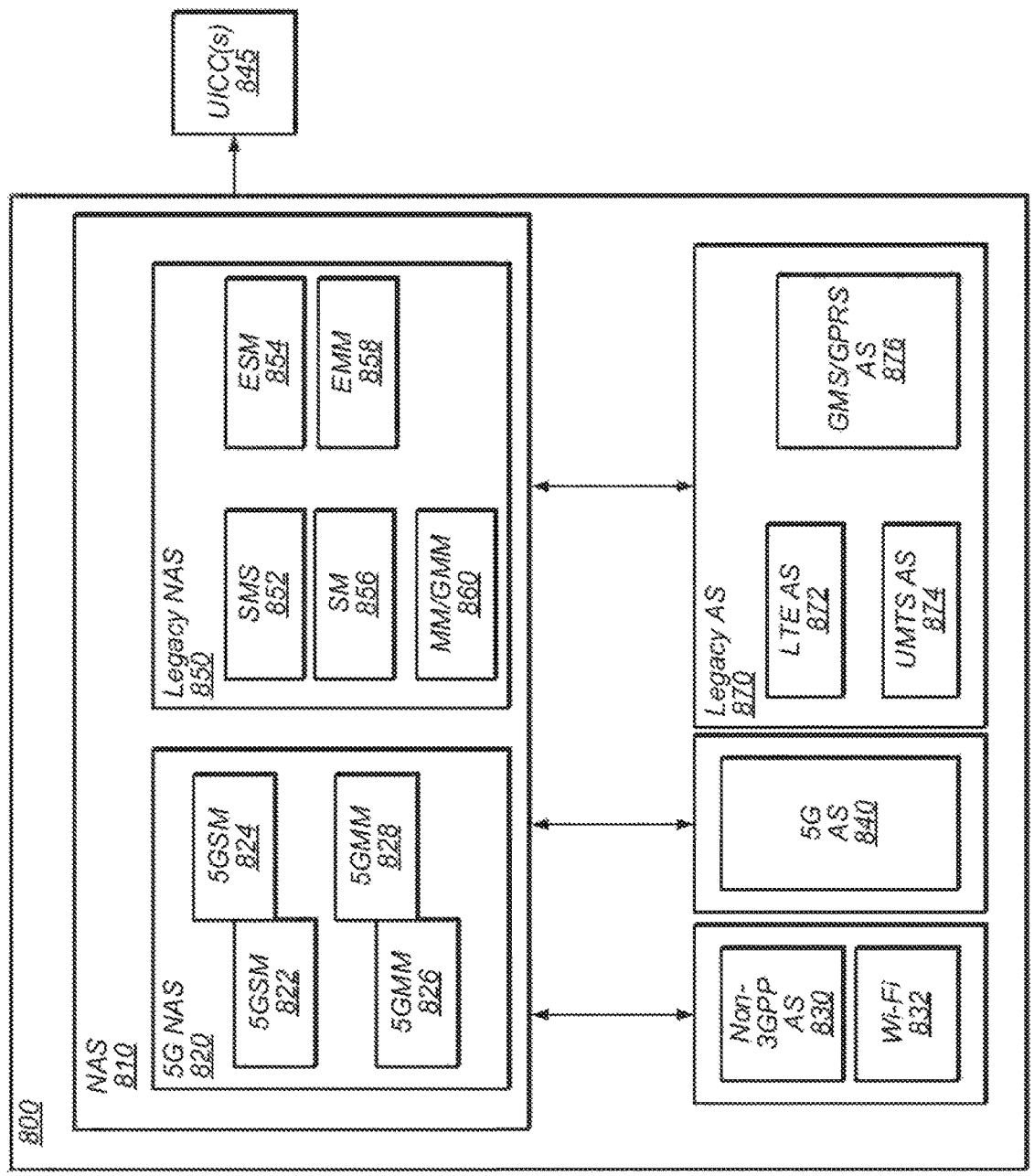
FIG. 8 illustrates an example of a baseband processor architecture for a UE, according to some embodiments.

FIGS. 7A, 7B and 8: 5G Core Network Architecture— Interworking with Wi-Fi

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. In some embodiments, such functional entities may reside on (and/or be executed by and/or be supported by) one or more servers 104 located within the RAN and/or core network. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMP 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF706a and the SMF 706b of the 5G CN. The AMF 706 may be connected to (or in communication with) the SMF 706a. In some embodiments, such functional entities may reside on (and/or be executed by and/or be supported by) one or more servers 104 located within the RAN and/or core network. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to implement mechanisms for a measurement period extension procedure, e.g., as further described herein.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods overhead reduction for multi-carrier beam selection and power control, e.g., as further described herein.

Listen Before Talk

In some existing implementations, a listen before talk (LBT) mechanism may be used to access shared medium (e.g., such as unlicensed bands commonly used for Wi-Fi, Bluetooth, and other short to medium range communications, e.g., non-3GGP access) to avoid conflicts or collisions (e.g., of transmissions emanating from two or more wireless devices attempting to access the shared medium) and to improve medium utilization efficiency. However, LBT mechanisms are not collision free. In other words, LBT mechanisms cannot guarantee collision free transmissions.

For example, in the case of a uni-cast transmission, a transmitter may readily detect a transmission collision based on a receiver's acknowledgement/negative acknowledgement (ACK/NACK) feedback. However, in the case of a multi-cast (or group-cast) transmission, a transmitter may not easily detect a collision based on receivers' ACK/NACKs due, at least in part, to heavy traffic associated with ACK/NACKs from multiple receivers and to a transmitter's inability to distinguish between (or isolate) transmission collisions from channel quality issues based on received ACK/NACKs. In other words, since receivers in a multi-cast transmission may have different locations with differing channel quality, a reason for a NACK (e.g., transmission collision versus poor channel quality) cannot be determined by the transmitter. Additionally, in the case of a broadcast transmission, feedback from receivers is known to not be feasible, thus, a transmitter has no knowledge of collisions. Further, in some implementations, a transmitter may reserve periodic slots within a reservation period for communication. In such implementations, if collisions occur, the collisions could persist for at least a portion of the reservation period (and in a worst-case scenario, the duration of the reservation period) if the transmitter does not detect (or is unable to detect) the collisions.

In current implementations of 3GPP 5G NR, studies in extending current NR operation to 71 GHz are related to UE measurements involving physical layer procedures. For example, some studies have been directed toward enhancing timing associated with beam-based operations to new sub-carrier spacing (e.g., 480 kHz and/or 960 kHz) in shared spectrum operations. Additionally, other studies have been directed toward channel access mechanisms using beam-based operations that comply with regulatory requirements associated with the unlicensed spectrum between 52.6 GHz and 71 GHz. Furthermore, some studies have attempted to specify listen before talk (LBT) and non-LBT procedures (of which no additional sensing mechanism is specified) with regard to omni-directional LBT, directional LBT, energy detection threshold enhancement, and receiver assistance in channel access. Moreover, some core specifications regarding new bands for the 52.6 GHz-71 GHz frequency range have been discussed in addition to defining uplink (UL) and downlink (DL) operation within the bands and excluding the intelligent transportation system (ITS) spectrum in said frequency range. Additionally, gNB (e.g., a base station), UE radio-frequency (RF), radio resource management (RRM), radio link monitoring (RLM), and broadcast multicast (BM) core requirements for bands (and combinations of bands) in the 52.6 GHz-71 GHz frequency range have also been studied.

Furthermore, when a UE makes a cell specific measurement during a LBT procedure in a NR environment, the UE may be susceptible to or experience LBT failures. These LBT failures may involve the UE performing beam measurements in the higher, unlicensed spectrum of the 52.6 GHz-71 GHz frequency range.

Figure 9:
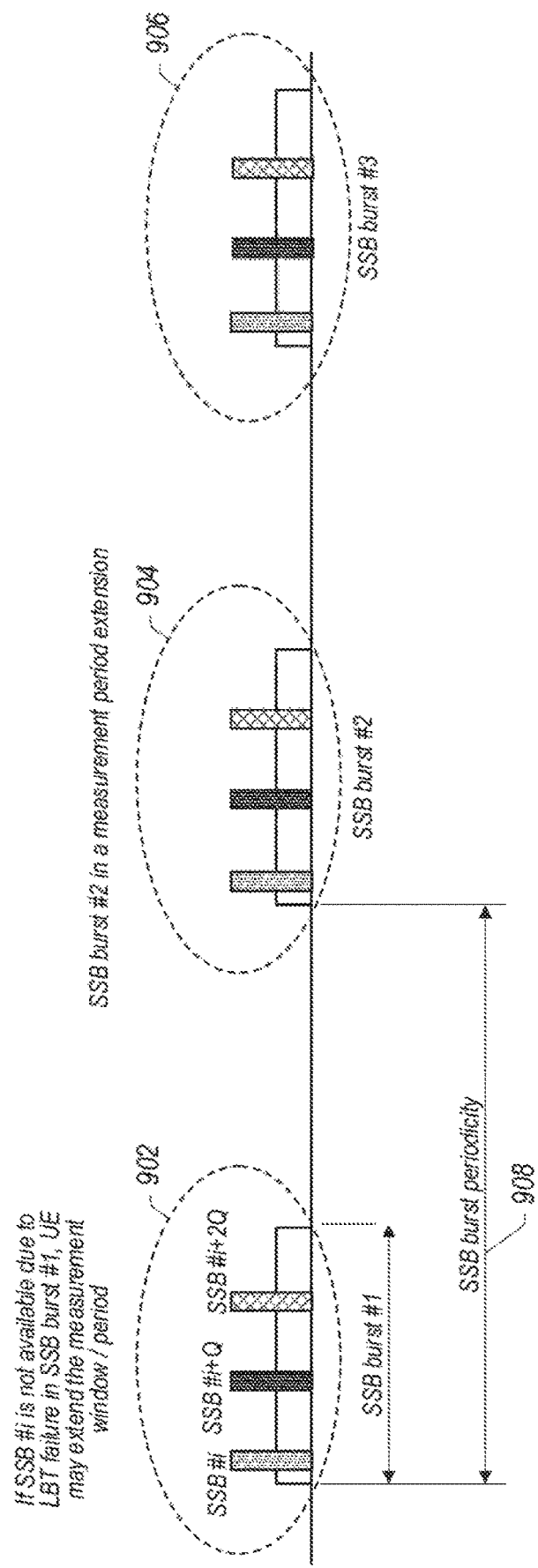
FIG. 9 illustrates an example of an LBT procedure involving SSB burst transmissions and experiencing LBT failures due to unavailable SSBs, according to some embodiments.

FIG. 9—SSB Burst Transmissions in LBT

In regard to SSB transmission in LBT, potential issues may arise when the UE performs measurements in a beam sweep procedure. For example, LBT failures may occur when the UE performs a measurement of a SSB burst that corresponds to an already occupied channel. In other words, a competing Wi-Fi device may already be attached and utilizing the channel associated with SSB burst.

For example, as shown in FIG. 9, a UE may receive an SSB burst (e.g., SSB burst #1) that includes multiple SSBs such as SSB #i, SSB #i+Q and SSB #i+2Q where i is an actual SSB index and Q is an SSB quasi-collocated (QCL) distance in the SSB burst for the same actual SSB index. In other words, i, i+Q, and i+2Q may correspond to QCL SSB positions. Additionally, the SSB burst may have an associated periodicity (e.g., SSB-Based RRM Measurement Timing Configuration (SMTC) or Discovery Burst Transmission Window (DBTW) periodicity) 908 between bursts.

In the scenario that SSB #i is not available due to LBT failure in SSB burst #1 (902), the UE may be configured to extend the measurement period or window in order to continue its LBT measurements as is customary for LBT beam management procedures. In doing so, the UE may receive SSB burst #2 (904) (or even SSB burst #3 (906)) in a measurement period extension. However, the UE may further need to determine which receiving beam to utilize in a measurement period extension and potentially comprised of new SSB burst #2. Additionally, and/or alternatively, the UE may need to determine how many SSB bursts are needed for a measurement period extension corresponding to the UE's receiving beam sweeping pattern.

Improved Secondary Cell (SCell) Activation Mechanism in the New Radio Unlicensed Spectrum Embodiments described herein provide mechanisms for improved SCell activation in the unlicensed spectrum through utilization of a timer-based mechanism. For example, when an SCell is located in an unlicensed band, a UE, such as UE 106, may experience LBT failures in the SCell and a network (e.g., a base station of the network) may be unable to transmit SSBs for the UE to perform measurements on. Thus, when the UE has received a media access control (MAC) control element (CE) command indicating a SCell to be activated in a secondary component carrier (SCC) in the unlicensed band, the UE may adjust its radio-frequency (RF) chain state (e.g., from a first state, such as state #1 to a second state, such as state #2), e.g., to accommodate the SCell to be activated and further attempt to receive SSBs on the SCell. However, the UE may still encounter LBT failures in the newly activated SCell which may further result or indicate failed SSB transmissions. Hence, rather than reverting back to RF chain state #1 from RF chain state #2, the UE may choose to remain in RF chain state #2 even after encountering LBT failures. However, in doing so, the UE's automatic gain control (AGC) may not continue to function properly or efficiently due to the interference on the SCell. Accordingly, the performance of the already activated cells may also be negatively affected. Moreover, due to the increased RF bandwidth of the unlicensed spectrum, this could not only cause a significant variation in AGC levels as compared to the licensed band but may also cause the UE to consume more power.

Alternatively, as outlined by the aforementioned method, the UE may choose to retune its RF chain back to state 1. In doing so, the UE may be able to resolve the varied AGC levels described above as well as decrease power consumption in the smaller RF bandwidth. However, in order to support the activated SCC in the unlicensed band, the UE will need to attempt to retune its RF chain again at some point in time in the future.

Moreover, with each subsequent tuning or retuning of RF chains (possibly in response to experiencing LBT failures and failed SSB transmissions), this may result in interruption in the primary cell (PCell), primary secondary cell group (SCG) cell (PSCell), and other activated SCells, thereby hurting throughput performance. This may be a more serious issue for component carriers with large channel bandwidths such as N77, N78, N79 in Frequency Range (FR) 1, current bands in FR 2, and potentially in even higher frequency bands currently not included in FR 2. Accordingly, improvements in the field are desired.

Figure 10:
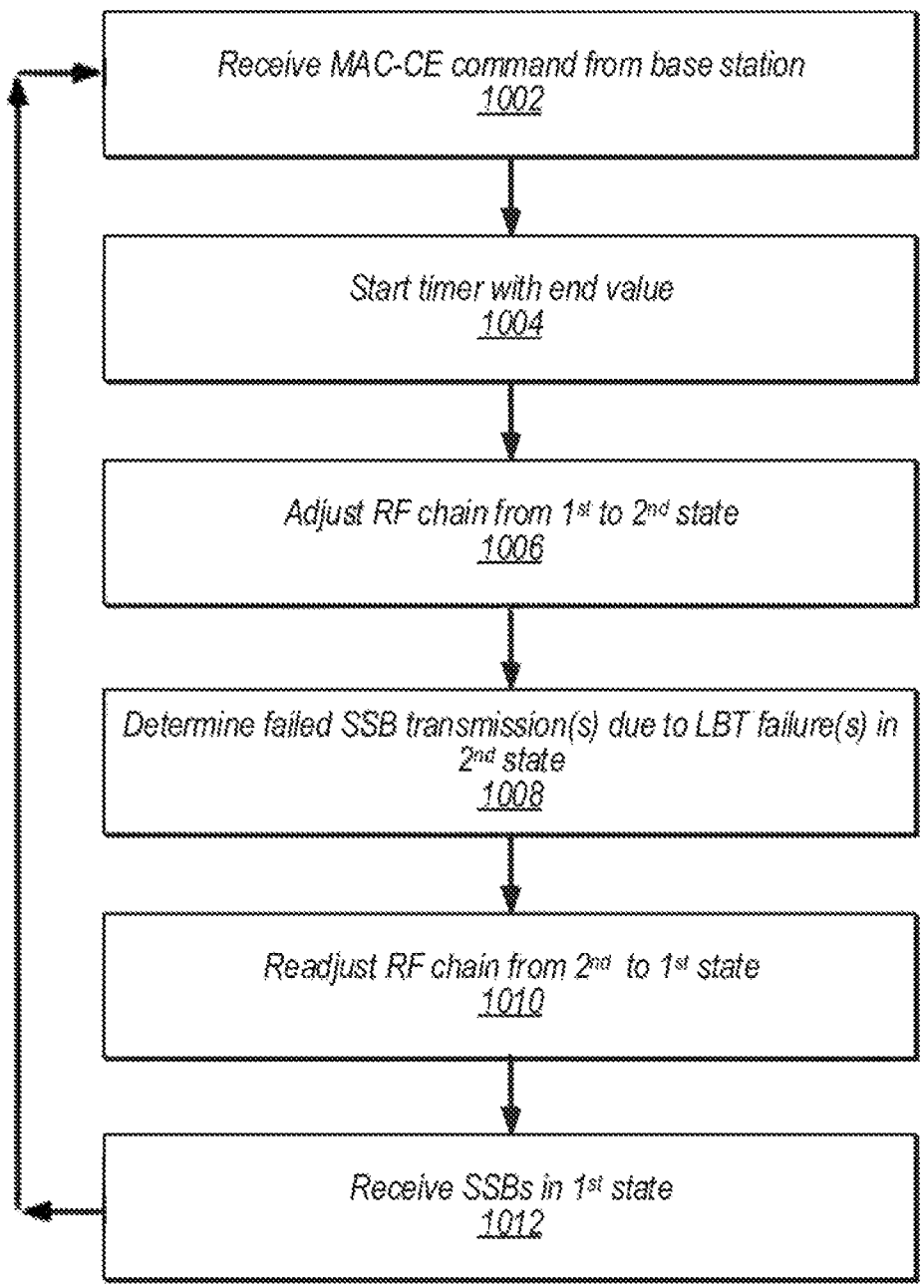
FIG. 10 illustrates a block diagram of an example method for improved SCell activation in the unlicensed spectrum through utilization of a timer-based mechanism, according to some embodiments.

FIG. 10—Method for Improved SCell Activation in the Unlicensed Spectrum Through Utilization of a Timer-Based Mechanism FIG. 10 illustrates a block diagram of an example of a method for improved SCell activation in the unlicensed spectrum through utilization of a timer-based mechanism, according to some embodiments.

The method shown in FIG. 10 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

In 1002, the UE may receive a media access control (MAC) control element (CE) from the network (e.g., a base station). The MAC CE may indicate to the UE the SCell in an unlicensed band is to be activated. In some aspects, the MAC CE may also specify a range of values including an end value for a timer for the UE. For example, the base station may specify (in the received MAC CE activation command) an end value for the UE to utilize in regard to retuning its RF chain to support the SCell activation. As described below in regard to FIG. 11, in some embodiments, the UE may revert from one RF chain state to another upon expiry of said timer. In other words, once the timer has reached the end value, the UE may revert back to a first state from a second state. Additionally, the MAC CE command may also include an upper bound or limit to the end value in the scenario in which the UE may be configured to select its own value or range of values for the timer, according to some embodiments.

In 1004, in response to receiving the MAC CE, the UE may start or initiate the timer with a pre-defined, network specified or UE selected value. For example, in some embodiments, the value may be pre-defined internally in the UE, specified by the network through the received MAC CE command, or selected by the UE based on certain operational conditions or parameters. The timer may start after the reception of the MAC CE and end upon expiry of the timer (e.g., reaching the upper limit or end value of the range of values) or upon the success or failure of the SCell activation process.

In 1006, the UE may adjust a radio-frequency (RF) chain from a first state to a second state, wherein the second state corresponds to the SCell during the activation process. For example, in order to support the activation of the SCell in the SCC (e.g., in the unlicensed band), the UE may need to adjust or retune its RF chain to accommodate the different parameters associated with the SCell in the SCC. Moreover, adjusting from a first state (e.g., state #1) to a second state (e.g., state #2) may involve retuning the UE's local oscillator and/or adjusting its RF bandwidth.

In 1008, the UE may determine if synchronization signal blocks (SSBs) in the activated SCell have or have not been transmitted (e.g., determine failed SSB transmissions) due to listen before talk (LBT) failures corresponding to the SCell activation. For example, the UE's may perform measurements of the synchronization signal blocks (SSBs) on SSB-Based RRM Measurement Timing Configuration (SMTC) occasions for the activated SCell. However, because the SSBs are expected to be transmitted from the base station, the UE may determine whether said SSB transmissions have failed due to listen before talk (LBT) failures corresponding to the to-be-activated SCell. Accordingly, the UE may need to perform at least one successful reception and decoding of the one or more SSBs before it can proceed with subsequent actions required for a successful SCell activation. In other words, due to the fact that the SCell is located in the unlicensed band coupled with LBT failures that may occur in said SCell, the base station may be unable to transmit SSBs for the UE to measure. Accordingly, in order to compensate in the event of encountered failed transmissions in the SCell, the UE may utilize the timer and an associated end value to trigger a response under certain conditions.

In 1010, the UE may readjust, in response to expiry of the timer, its RF chain from the second state (e.g., state #2) to the first state (e.g., state #1). For example, if the timer reaches the pre-defined, network specified, or UE selected upper limit of the range of values for the timer, the UE may revert its RF chain back to state #1 from state #2. In doing so, the UE may be able to mitigate, correct, or lessen AGC interference issues and higher power consumption associated with the increased bandwidth of state #2. Accordingly, in reverting back to state #1 from state #2, the UE may need to retune its local oscillator and RF bandwidth back to the appropriate parameters associated with state #1.

Finally, in 1012, the UE may receive one or more additional SSB bursts and possibly other data and control transmissions in RF chain state #1. As previously described, the smaller bandwidth of state #1 may enable the UE to lower its power consumption and resolve AGC interference issues (possibly experienced in the unlicensed spectrum). Alternatively, the UE may also attempt to restart the SCell activation process if it receives an additional MAC CE command from the base station indicating the activation of an SCell. In this scenario, the UE may perform the 1002-1012 one or more times until another success or failure of the SCell activation.

Figure 11:
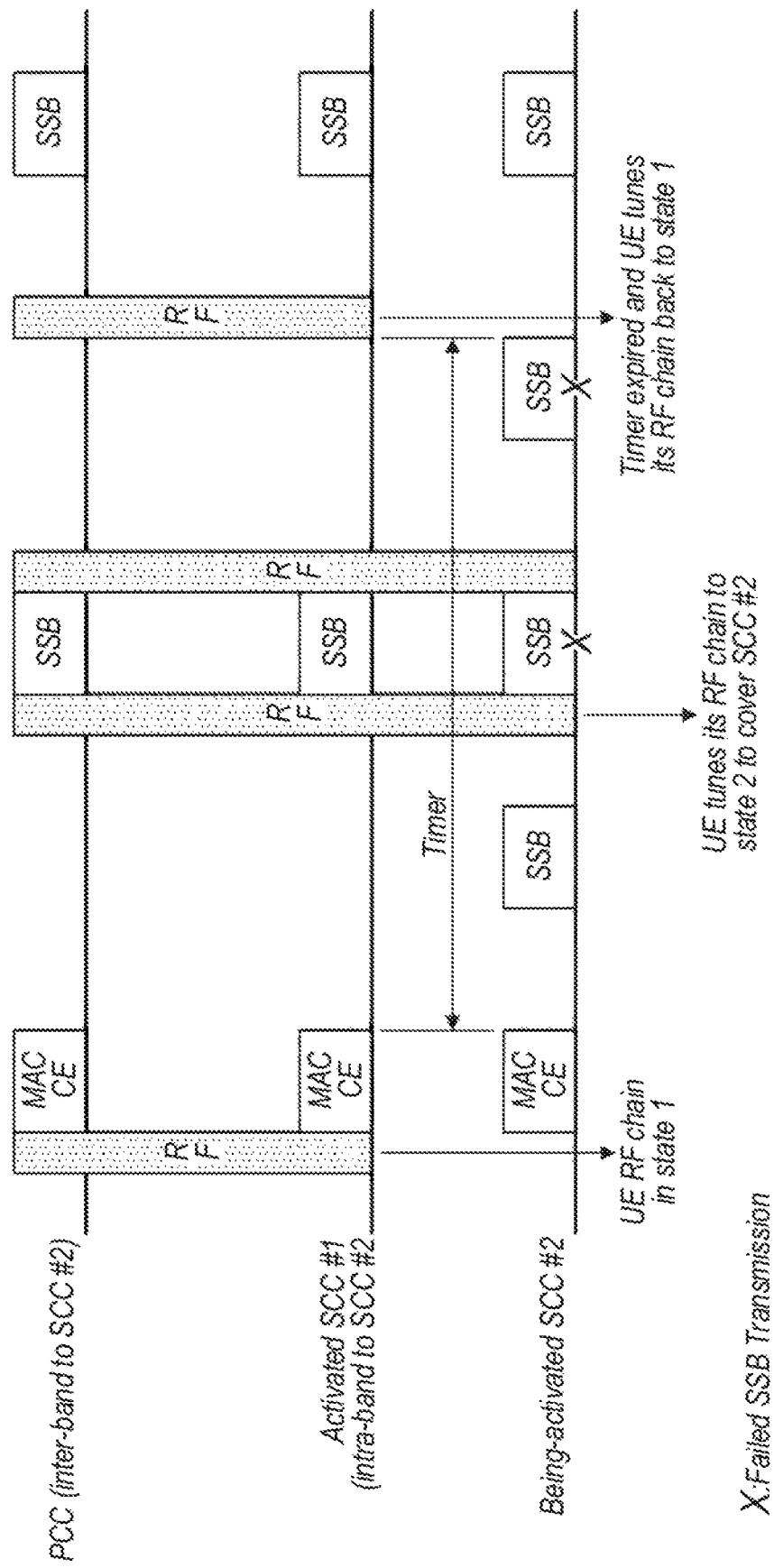
FIG. 11 illustrates an example of timer-based RF tuning between a primary component carrier (PCC) and unlicensed band secondary component carriers (SCCs), according to some embodiments.

FIG. 11—Timer Based RF Tuning Between PCC and Unlicensed Band SCCs

FIG. 11 illustrates timer-based RF tuning between PCC and Unlicensed Band SCCs, according to some embodiments.

In intra-band and inter-band carrier aggregation scenarios involving the unlicensed band, when an SCell located in the unlicensed band is activated, the UE and network may have a number of behavioral responses. For example, upon receiving a MAC-CE command from the network (e.g., via a base station or gNB) indicating that an SCell is to be activated in a SCC, the UE may retune or adjust its RF chain from state 1 (corresponding to the PCC and already activated SCC #1) to state 2. This RF chain adjustment may include retuning the UE's local oscillator (LO), adjusting its radio-frequency (RF) bandwidth (BW) among other parameters. In doing so, the UE's state 2 RF chain may allow for support of the SCell (SCC #2) to be activated. Additionally, the UE may use the available SSB-Based Measurement Timing Configuration (SMTC) events to measure the SSBs transmitted on the SCell and additionally adjust its automatic gain control (AGC) to a proper working condition or value based on the received signal strength indicator (RSSI) measurement concerning the SSB.

As shown in FIG. 11, a UE may be initially utilizing the inter-band band combination (BC) including PCC and SCC #1. Additionally, while SCC #1 may be intra-band to SCC #2, the PCC may be considered inter-band to SCC #2 since SCC #2 is being activated in this example.

As briefly described above, in response to having received a MAC-CE command from the network, the UE may start a timer with which to use as an indicator for the when to adjust its RF chain state.

Accordingly, the UE may adjust its RF chain from a first state (state #1, as shown in FIG. 11) to a second state (state #2, as shown in FIG. 11) in order to accommodate the activated SCell.

In some embodiments, when the UE has received the SCell activation command from the network, the UE may start a timer with a range of values. Moreover, the UE may be configured such that if the timer reaches its assigned end value of time, the UE may revert back to a previous RF state. In other words, the UE may start a timer when retuning its RF chain to state #2 from state #1 and before the timer expires, the UE will remain in state #2. Alternatively, once the timer expires, the UE may be configured to retune its RF chain back to state #1. For example, the timer may be set to infinity or some extremely large value which may allow the UE to remain in state #2 indefinitely and never tune back its RF chain until the SCell activation succeeds or fails, according to some embodiments. In other words, because the timer never reaches its assigned end-value of time (e.g., infinity), the UE may never revert back to state #1 from state #2 until the SCell activation succeeds or fails. Alternatively, in some embodiments, the timer may be set to a finite amount of time in which once the end value is reached, the UE may revert back to state #1. Furthermore, the timer may be associated with a number of unavailable SMTC occasions due to LBT failures, according to some embodiments. In other words, the UE and timer may be configured such the once the UE reaches or experiences a pre-defined upper limit of LBT failures or failed transmissions in the SCC, the UE may be configured to retune its RF chain from state #2 back to state #1.

Additionally, the UE may have a number of options regarding how the timer value is configured. For instance, in some embodiments, the value of the timer may be pre-defined for the UE. In other words, the value of the timer may be pre-defined in the UE's hardware and/or software and may be the timer value that the UE always utilizes. Accordingly, the UE may not be able to select an end value for the timer and possibly be unable to have the timer be externally configured by the network.

Furthermore, in some embodiments, the network may configure or assign a value of the timer for the UE. For example, the network (e.g., a base station) may configure a value of the timer through a MAC CE when sending the command for the activation of the SCell. In other words, the to network may be able to start the UE's timer in addition to sending the SCell activation command through use of a MAC CE.

Moreover, in some embodiments, the UE may be configured to pick or select an appropriate timer value (e.g., an end value) when starting the timer. In other words, the UE may be more aware of its operating conditions than that of the network and accordingly may select a timer value based on said operating conditions. For example, the UE may select a timer value based on its own implementation such as requirement interruption times, power consumption, number of activated component carriers (CCs) or how sensitive its automatic gain control (AGC) is to the interference in the unlicensed band, among other parameters.

Additionally, when the UE has selected a timer value based on one or more of the aforementioned parameters, the UE may be required to inform the network of the selected value. In doing so, the network may be able to perform better coordinated communications with the UE having a better understanding of the UE's timer-based behavior. In some embodiments, the UE selected timer value may be lower than an upper bound or threshold that is pre-defined or signaled by the network. In other words, the network or UE may be configured to set an upper limit to the timer value such that the UE does not exceed said threshold when selecting a timer value.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a memory; and
at least one processor in communication with the memory, wherein the at least one processor is configured to:
receive a media access control (MAC) control element (CE) from a base station (BS) indicating a secondary cell (SCell) to be activated in an unlicensed band;
initiate, in response to receiving the MAC CE, a timer with an end value;
adjust a radio-frequency (RF) chain from a first state to a second state, wherein the second state corresponds to the SCell;
determine, based on measurements of one or more synchronization signal blocks (SSBs) transmitted from the BS indicating one or more listen before talk (LBT) failures corresponding to the SCell, one or more failed SSB transmissions corresponding to the Scell;
readjust, in response to expiry of the timer, the RF chain from the second state to the first state; and
receive one or more additional SSBs in the first state.

2. The apparatus of claim 1,
wherein the end value is pre-defined.
3. The apparatus of claim 1,
wherein the end value is specified by the network.
4. The apparatus of claim 1,
wherein the end value is determined by the apparatus.
5. The apparatus of claim 4,
wherein, to determine the end value, the at least one processor is further configured to determine the end value based, at least in part, on at least one of:
an RF retuning time;
power consumption associated with the RF chain;
at least one of a number of activated component carriers (CCs) and their associated bandwidths; and
automatic gain control (AGC) performance in the unlicensed band performance in the unlicensed band.
6. The apparatus of claim 4,
wherein the at least one processor is further configured to generate instructions to inform the base station of the determined end value.
7. The apparatus of claim 4,
wherein the determined end value is below an upper bound signaled by the base station.
8. The apparatus of claim 4,
wherein the determined end value is below a pre-defined upper bound.
9. A user equipment device (UE), comprising:
at least one antenna;
at least one radio, wherein the at least one radio is configured to perform cellular communication using at least one radio access technology (RAT);
one or more processors coupled to the at least one radio, wherein the one or more processors and the at least one radio are configured to perform voice and/or data communications;
wherein the one or more processors are configured to cause the UE to:
receive a media access control (MAC) control element (CE) from a base station (BS) indicating a secondary cell (SCell) to be activated in an unlicensed band;
initiate, in response to receiving the MAC CE, a timer with an end value;
adjust a radio-frequency (RF) chain from a first state to a second state, wherein the second state corresponds to the SCell;
determine, based on measurements of one or more synchronization signal blocks (SSBs) transmitted from the BS indicating one or more listen before talk (LBT) failures corresponding to the SCell, one or more failed SSB transmissions corresponding to the SCell;
readjust, in response to expiry of the timer, the RF chain from the second state to the first state; and
receive one or more additional SSBs in the first state.
10. The UE of claim 9,
wherein the end value is pre-defined.
11. The UE of claim 9,
wherein the end value is specified by the network.
12. The UE of claim 9,
wherein the end value is determined by the UE.
13. The UE of claim 12,
wherein, to determine the end value, the at least one processor is further configured to cause the UE to determine the end value based, at least in part, on at least one of:
an RF retuning time;
power consumption associated with the RF chain;

at least one of a number of activated component carriers (CCs) and their associated bandwidth; and automatic gain control (AGC) performance in the unlicensed band performance in the unlicensed band.

14. The UE of claim 12,
wherein the at least one processor is further configured to cause the UE to generate instructions to inform the base station of the selected end value.

15. The UE of claim 12,
wherein the determined end value is below an upper bound signaled by the base station.

16. The UE of claim 12,
wherein the determined end value is below a pre-defined upper bound.

17. A non-transitory computer readable storage medium storing program instructions executable by at least one processor to cause a user equipment (UE) to:
receive a media access control (MAC) control element (CE) from a base station (BS) indicating a secondary cell (SCell) to be activated in an unlicensed band;
initiate, in response to receiving the MAC CE, a timer with an end value;
adjust a radio-frequency (RF) chain from a first state to a second state, wherein the second state corresponds to the SCell;
determine, based on measurements of one or more synchronization signal blocks (SSBs) transmitted from the BS indicating one or more listen before talk (LBT) failures corresponding to the SCell, one or more failed SSB transmissions corresponding to the SCell;
readjust, in response to expiry of the timer, the RF chain from the second state to the first state; and
receive one or more additional SSBs in the first state.

18. The non-transitory computer readable storage medium of claim 17,
wherein the end value is specified by the network.

19. The non-transitory computer readable storage medium of claim 17,
wherein the end value is determined by the UE.

20. The non-transitory computer readable storage medium of claim 19,
wherein, to determine the end value, the at least one processor is further configured to determine the end value based, at least in part, on at least one of:
an RF retuning time;
power consumption associated with the RF chain;
at least one of a number of activated component carriers (CCs) and their associated bandwidth; and
automatic gain control (AGC) performance in the unlicensed band performance in the unlicensed band.

* * * * *